(12) United States Patent
Rouby et al.

(10) Patent No.: US 10,967,594 B2
(45) Date of Patent: Apr. 6, 2021

(54) HEAD FOR THE CO-EXTRUSION OF A COMPLEX RUBBER PROFILED ELEMENT INTENDED FOR THE MANUFACTURE OF A TIRE

(71) Applicant: COMPAGNIE GENERALE DES ETABLISSEMENTS MICHELIN, Clermont-Ferrand (FR)

(72) Inventors: Mickael Rouby, Clermont-Ferrand (FR); Christophe Bessac, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 8 days.

(21) Appl. No.: 16/471,838

(22) PCT Filed: Oct. 31, 2017

(86) PCT No.: PCT/EP2017/077856
§ 371 (c)(1),
(2) Date: Jun. 20, 2019

(87) PCT Pub. No.: WO2018/114104
PCT Pub. Date: Jun. 28, 2018

(65) Prior Publication Data
US 2020/0094463 A1    Mar. 26, 2020

(30) Foreign Application Priority Data
Dec. 20, 2016   (FR) ...................................... 1662939

(51) Int. Cl.
*B29D 30/52*    (2006.01)
*B29C 48/21*    (2019.01)
(Continued)

(52) U.S. Cl.
CPC .............. *B29D 30/52* (2013.01); *B29C 48/21* (2019.02); *B29C 48/307* (2019.02);
(Continued)

(58) Field of Classification Search
USPC ......................................................... 425/374
See application file for complete search history.

(56) References Cited

U.S. PATENT DOCUMENTS 4,526,528 A   7/1985   Kline et al.
4,539,169 A   9/1985   Nixon et al.
(Continued)

FOREIGN PATENT DOCUMENTS

CN    1463220 A    12/2003
CN    101856864 A   12/2009
(Continued)

OTHER PUBLICATIONS

International Search Report dated Jan. 24, 2018, in corresponding PCT/EP2017/077856 (3 pages).
Co-pending U.S. Appl. No. 16/065,536, filed Dec. 20, 2016.

*Primary Examiner* — Marc C Howell
*Assistant Examiner* — John J Derusso
(74) *Attorney, Agent, or Firm* — Venable LLP

(57) ABSTRACT

A head (50), for the co-extrusion of a complex rubber profiled element, includes a lower wall (56) of cylindrical profile, a first extrusion unit (B60) having a first extrusion duct (60) divided into various sub-ducts (60-1, 60-2, 60-3, 60-4), a first profiling blade (62) defining a first shaping profile (P62) that is discontinuous, a second extrusion unit (B64) including a second extrusion duct (64) divided into various sub-ducts (64-1, 64-2, 64-3, 64-4), a second profiling blade (66) including at least one tooth (67-1, 67-2, 67-3) situated in the continuation of a divider (72-1, 72-2, 72-3), and this second profiling blade (P66) incorporating at least (Continued)

one third extrusion duct, each outlet of a third extrusion duct closely adjoining a tooth (67-1, 67-2, 67-3) of the second profiling blade (66), and a third profiling blade (74) defining a final shaping profile (P74).

11 Claims, 3 Drawing Sheets

(51) Int. Cl.
*B29C 48/35* (2019.01)
*B29C 48/345* (2019.01)
*B29C 48/12* (2019.01)
*B29K 21/00* (2006.01)
*B29L 30/00* (2006.01)
*B29C 48/07* (2019.01)
*B29C 48/305* (2019.01)

(52) U.S. Cl.
CPC ............ *B29C 48/345* (2019.02); *B29C 48/35* (2019.02); *B29C 48/07* (2019.02); *B29C 48/12* (2019.02); *B29C 2948/92904* (2019.02); *B29K 2021/00* (2013.01); *B29L 2030/002* (2013.01)

(56) References Cited

U.S. PATENT DOCUMENTS

| | | |
|---|---|---|
| 5,017,118 A | 5/1991 | Looman et al. |
| 6,269,854 B1 | 8/2001 | Matsuo et al. |
| 6,695,606 B1 | 2/2004 | Burg et al. |
| 6,994,817 B2 | 2/2006 | Calvar et al. |
| 9,027,615 B2 | 5/2015 | Dermience et al. |
| 9,487,892 B2 | 11/2016 | Abad |
| 2001/0022410 A1 | 9/2001 | Benatti |
| 2002/0190420 A1 | 12/2002 | Benatti |
| 2003/0136498 A1 | 7/2003 | Calvar et al. |
| 2008/0105353 A1 | 5/2008 | Losi et al. |
| 2014/0069561 A1 | 3/2014 | Dermience et al. |
| 2014/0090548 A1 | 4/2014 | Abad |
| 2015/0107735 A1 | 4/2015 | Djelloul-Mazouz et al. |
| 2019/0001547 A1 | 1/2019 | Bessac et al. |
| 2020/0101655 A1 | 4/2020 | Rouby et al. |

FOREIGN PATENT DOCUMENTS

| | | |
|---|---|---|
| CN | 103660804 A | 3/2014 |
| EP | 0 139 604 A2 | 5/1985 |
| EP | 0174260 A2 | 3/1986 |
| EP | 0847880 A1 | 6/1998 |
| EP | 0868991 A1 | 10/1998 |
| EP | 1448355 | 8/2004 |
| EP | 2865543 A1 | 4/2015 |
| FR | 2 648 388 A1 | 12/1990 |
| FR | 2 916 383 A1 | 11/2008 |
| JP | 60-54831 A | 3/1985 |
| WO | 99/38664 A1 | 8/1999 |
| WO | 2004/096583 A1 | 11/2004 |
| WO | 2012/156404 A1 | 11/2012 |

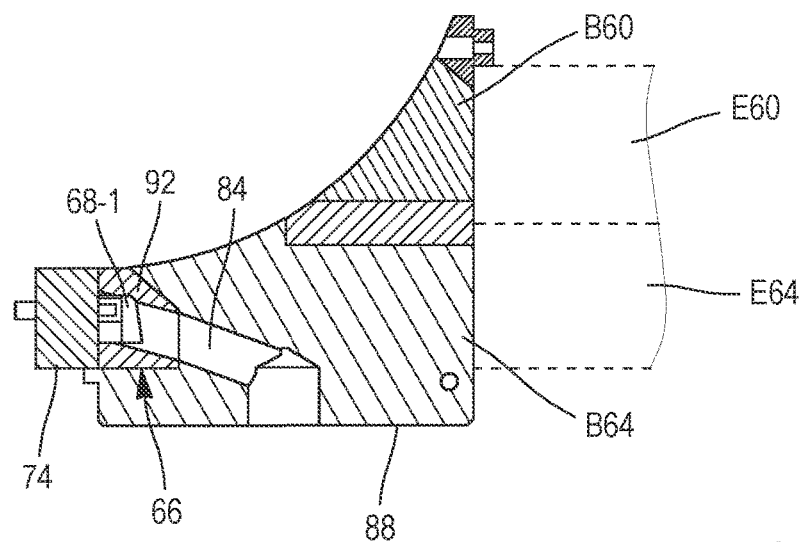
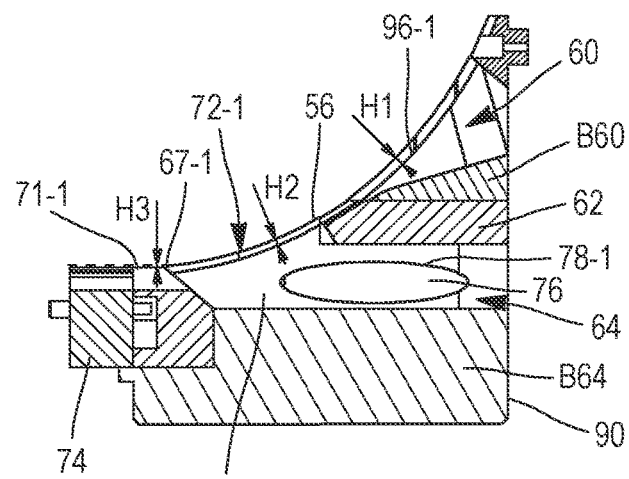
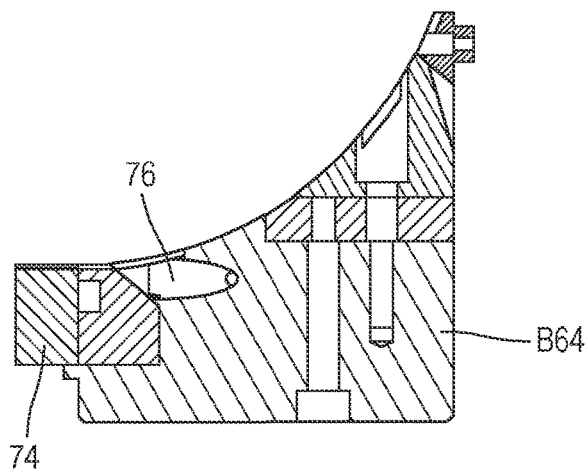
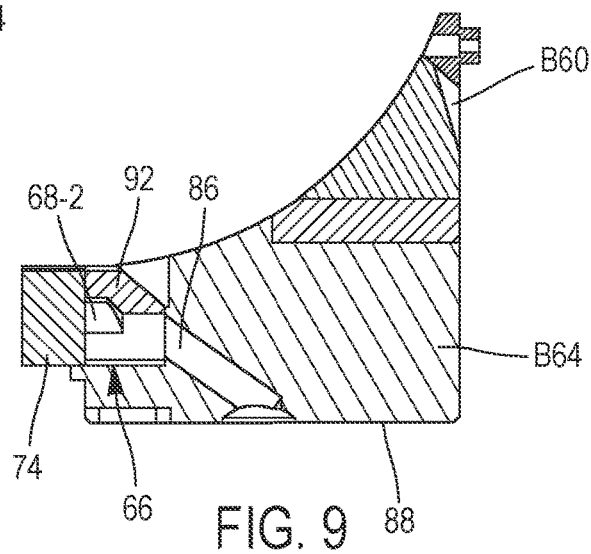
FIG. 6
FIG. 7
FIG. 8
FIG. 9

HEAD FOR THE CO-EXTRUSION OF A COMPLEX RUBBER PROFILED ELEMENT INTENDED FOR THE MANUFACTURE OF A TIRE

BACKGROUND

The invention falls within the field of tyre manufacture, and more precisely within the field of the co-extrusion of complex rubber profiled elements.

What is meant by a complex rubber profiled element is a profiled element made up of different profiled elements made from different elastomeric compounds and assembled with one another.

When a green tyre is being built, a profiled element of tyre tread taking the form of a portion cut from a complex and unvulcanized rubber profiled element is laid on the shaped carcass.

More specifically, and as illustrated in FIG. 1, this portion of complex rubber profiled element 10 includes a transversely continuous sublayer 12 on which another transversely continuous layer 14 is superposed. This other layer 14 is referred to as the tread because it is intended to come into contact with the ground when the tyre is running along the ground. Because the sublayer 12 is not intended to come into contact with the ground, it is made from a different elastomeric compound from the tread 14 and does not, for example, have the same composition or the same characteristics and performance.

According to a known method of manufacture, this complex rubber profiled element is obtained by co-extrusion. Using this technique, the various profiled elements of different compounds of the complex profiled element are extruded and assembled simultaneously, on a single manufacturing machine.

Co-extrusion also allows the manufacture of complex profiled elements including a sublayer 12, a tread 14, and other protective profiled elements superposed on the transverse ends of the tread 14 and made from a third elastomeric compound having a composition and characteristics that are different from the characteristics of the sublayer compound and of the tread compound.

However, and like the sublayer 12 and the tread 14, these protective profiled elements are transversely continuous.

Because of the poor electrical conductivity of the elastomeric compounds used for producing the sublayer 12 and the tread 14, co-extrusion machines have been developed that allow the sublayer 12 and the tread 14 to be co-extruded with an insert, made from an electrically conducting elastomeric compound, passing through them.

Such a co-extrusion machine is described, for example in European Patent EP1448355.

According to that document EP1448355, this machine provides a main extruder having an extrusion head with at least two ducts for the flow of a sublayer rubber compound and of a tread rubber compound, the ducts opening onto an extrusion orifice through which the two, sublayer and tread, rubber compounds are discharged, and the extrusion orifice being delimited by a first wall and a second wall.

In order to create an electrically conducting insert through the sublayer and the tread of the co-extruded complex profiled element, the extrusion head also includes at least one micro-extruder of a third, electrically conducting, rubber compound, and the extrusion head of this micro-extruder is equipped at its end with a nozzle, the nozzle passing through the two flow ducts so that the third, electrically conducting, rubber compound is inserted into the sublayer and tread rubber compounds upstream of the extrusion orifice.

A first disadvantage is that the nozzle described in that document EP1448355 is not suitable for extruding an insert made from an elastomeric compound that gives it great stiffness, or at least stiffness higher than the stiffness conferred on each of the sublayer and the tread by their respective compounds. This is because such a compound would need an extrusion pressure that is too high in comparison with the extrusion pressures used to extrude the sublayer and tread compounds, and this could detract from the quality of the co-extruded complex profiled element, notably by leading to the extrusion of an insert that is far wider than needed for electrical conduction or of a cross section that can vary randomly along the length of the profiled element.

Another disadvantage, and regardless of whether or not the third compound extruded by this nozzle gives the insert high stiffness, is that this nozzle does not allow the third material to be extruded with a cross section that is precise in the transverse plane of the complex profiled element. Furthermore, neither does this nozzle make it possible to create an insert that is not flanked on either side by the tread and the sublayer.

Yet, with the increasing use of treads made from elastomeric compounds that give these treads increasingly low stiffness and therefore increasingly high hysteresis, there is nowadays within the tyre building industry a need to stiffen the complex tread profiled elements via inserts that have a precise cross section in the transverse plane of the complex profiled element, that are not flanked on either side by the tread and the sublayer and that are made from an elastomeric compound that gives them a stiffness higher than the stiffness conferred upon the sublayer and the tread by their respective compounds.

Thus, an objective of the present invention is to combat at least one of the disadvantages identified in the prior art and to meet the aforementioned needs of industry.

SUMMARY

To this end, one subject of the invention is a head for the co-extrusion of a complex rubber profiled element intended for the manufacture of a tyre, the head being intended to be mounted on a cylindrical-roller co-extrusion machine and for this purpose including a lower wall of cylindrical profile extending radially lengthwise in a longitudinal direction about a central axis and extending rectilinearly widthwise in a transverse direction parallel to the central axis and perpendicular to the longitudinal direction.

According to the invention, the head includes, from upstream to downstream of this lower wall of cylindrical profile, and in the longitudinal direction:

a first extrusion unit having a first extrusion duct opening into the lower wall of the co-extrusion head, this first extrusion duct being divided into various sub-ducts in the transverse direction, a first profiling blade defining a first shaping profile that is discontinuous in the transverse direction and situated radially beyond the lower wall of the co-extrusion head intermittently in the transverse direction, a second extrusion unit having a second extrusion duct opening into the lower wall of the co-extrusion head, this second extrusion duct being divided into various sub-ducts in the transverse direction, a second profiling blade defining a second shaping profile situated radially beyond the lower wall of the co-extrusion head, this second profile having no discontinuity in the transverse direction but the second profiling blade including at least one tooth extending radially inwards but not reaching the lower wall of the co-extrusion head, each tooth being situated in the continuation of the longitudinal direction of a divider dividing the first extrusion duct into sub-ducts in the transverse direction, creating a discontinuity in the first shaping profile of the first profiling blade in the transverse direction and dividing the second extrusion duct into sub-ducts in the transverse direction, and this second profiling blade incorporating at least one third extrusion duct opening into the lower wall of the co-extrusion head, and each outlet of a third extrusion duct closely adjoining a tooth of the second profiling blade, a third profiling blade defining a final shaping profile situated radially beyond the lower wall of the co-extrusion head, this final shaping profile having no discontinuity in the transverse direction, the third profiling blade including at least one tooth extending radially inwards but not reaching the lower wall of the co-extrusion head, each tooth of this third profiling blade being situated in front of a tooth of the second profiling blade.

BRIEF DESCRIPTION OF THE FIGURES

Further features and advantages of the invention will become apparent from the following description. This description, which is given by way of non-limiting example, refers to the appended drawings, in which:

FIG. 6 is a first view in longitudinal section of a co-extrusion head according to the invention;

FIG. 7 is a second view in longitudinal section of a co-extrusion head according to the invention;

FIG. 8 is a third view in longitudinal section of a co-extrusion head according to the invention; and FIG. 9 is a fourth view in longitudinal section of a co-extrusion head according to the invention.

DETAILED DESCRIPTION

Figure 1:
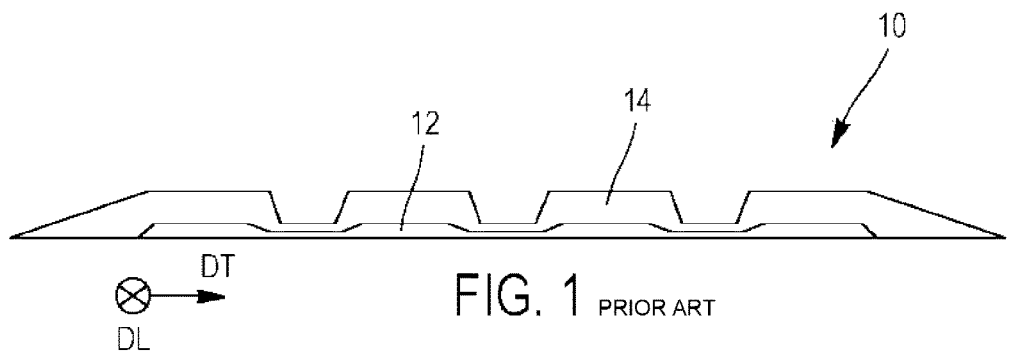
FIG. 1 is a schematic view in cross section of a complex rubber profiled element according to the prior art.
Figure 2:
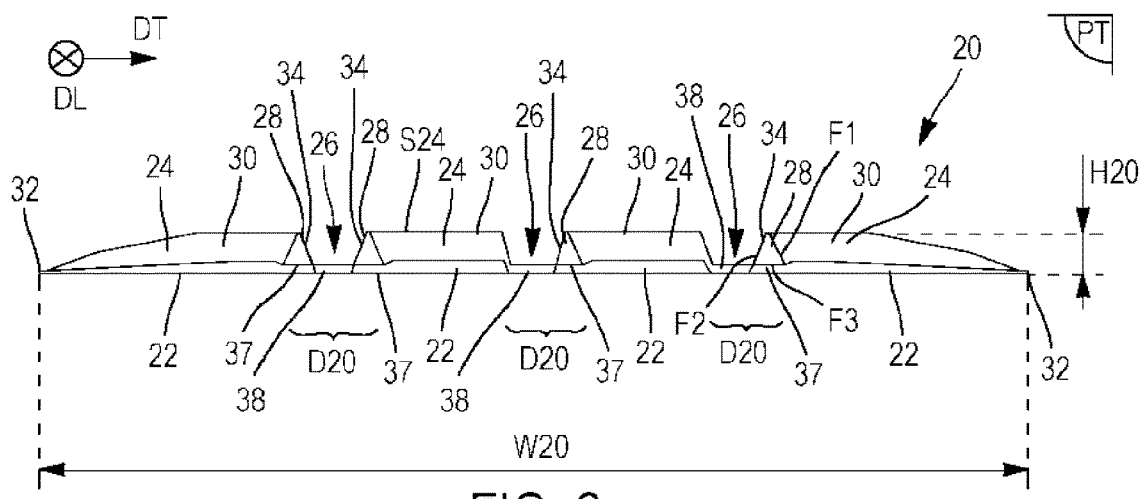
FIG. 2 is a schematic view in cross section of a complex rubber profiled element that can be produced with a co-extrusion head according to the invention.

FIG. 2 schematically illustrates a complex rubber profiled element intended for the manufacture of tyres and which can be manufactured by co-extrusion using the present invention.

This complex rubber profiled element 20 includes along its height H20 a first layer 22, referred to as sublayer, of a first rubbery material, and the second layer 24, referred to as tread, of a second rubbery material superposed on the sublayer 22.

What is meant by a rubbery material is an unvulcanized elastomeric compound. Within the context of the present invention, the sublayer 22 and the tread 24 are made from different materials, and therefore from elastomeric compounds that do not have the same composition and/or the same characteristics.

Moreover, and with a view to creating the circumferential voids of the future tyre, the complex rubber profiled element 20 also includes longitudinal grooves 26. In the example illustrated in FIG. 2, the complex rubber profiled element 20 has three longitudinal grooves 26. These three longitudinal grooves 26 run parallel to one another in the longitudinal direction DL considered along the length of the complex profiled element 20. These three longitudinal grooves 26 are spaced apart from one another in the transverse direction DT considered across the width W20 of the complex profiled element 20. These three longitudinal grooves 26 extend depthwise into the height H20 of the complex profiled element 20, without passing through same. These three longitudinal grooves 26 open onto the upper surface S24 of the tread 24. These three longitudinal grooves 26 divide the profiled element into four longitudinal blocks 30, in which the tread patterns of the future tyre will be moulded. The two central blocks 30 have a substantially parallelepipedal profile in the transverse plane PT of the complex profiled element 20, whereas the end blocks 30 have a substantially trapezoidal profile in the transverse plane PT of the complex profiled element 20 and taper toward the transverse ends 32 of the complex profiled element 20 in the transverse direction DT.

According to the invention, this tread 24 and this sublayer 22 have at least one discontinuity D20 in the width W20 of the complex profiled element 20 so that at least one insert 28 of a third rubbery material is inserted into each discontinuity D20 of the tread 24 and of the sublayer 22 at the time of co-extrusion.

As the complex rubber profiled element 20 has three longitudinal grooves 26 in the example illustrated in FIG. 2, the tread 24 and the sublayer 22 exhibit three discontinuities D20 in the width W20 of the complex profiled element 20 and at least one insert 28 in each of these discontinuities D20.

The third rubbery material from which the inserts 28 are made is different from the materials of the sublayer 22 and of the tread 24. This third material of the inserts 28 is an elastomeric compound having a different composition and/or different characteristics from the compounds that form the sublayer and the tread. Advantageously, this third material of the inserts 28 offers higher stiffness than the materials of the sublayer 22 and of the tread 24. Thus, the inserts 28 make it possible to stiffen the longitudinal blocks 30, thereby making it possible to use, for the creation of the tread 24, a material that is less stiff and offers the future tyre better grip performance.

More specifically, each insert 28 extends into the height H20 of the complex profiled element 20 without passing through it, a thickness of sublayer 22 being present underneath each insert 28. Each insert 28 has a precise cross section in the transverse plane PT of the profiled element 20. Thus, the cross section of an insert 28 in the transverse plane PT includes at least one triangular subsection.

According to the invention, the cross section of an insert 28 in the transverse plane PT is triangular. In addition, two inserts 28 of triangular cross section may lie in one and the same discontinuity D20 while at the same time being distant from one another in the transverse direction DT. Irrespective of whether there are one or two inserts 28 in a discontinuity D20, the bottom of a longitudinal groove 26 is made up of a band 38 of substantially parallelepipedal cross section, of the material of the tread 24.

Each insert 28 forms a sidewall 34 of a block 30. Therefore, a first face F1 of an insert 28 extending along the height H20 of the profiled element 20 is closely adjacent to the material of the tread 24, a second face F2 of an insert 28 extending into the height H20 of the profiled element 20 forms the sidewall 34 of a block 30, and a third face F3 of an insert 28 is closely adjacent to the material of the sublayer 22.

Figure 3:
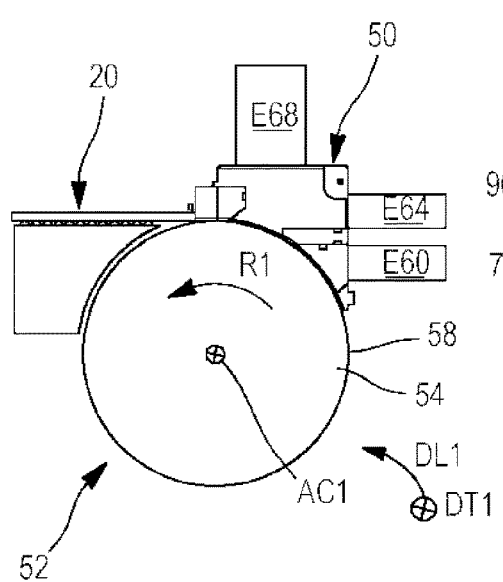
FIG. 3 is a schematic side view of a co-extrusion machine having a co-extrusion head according to the invention.
Figure 5:
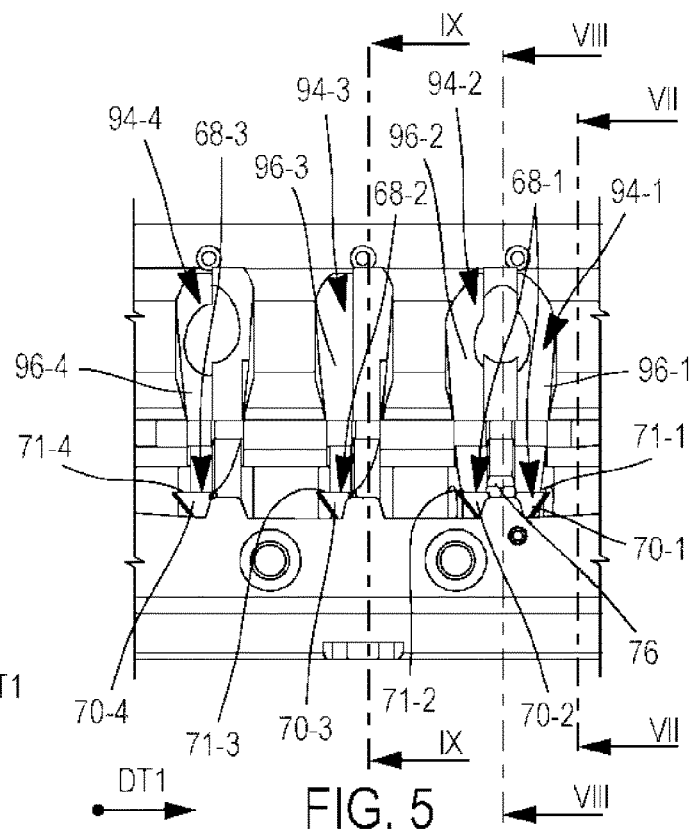
FIG. 5 is a detailed face-on view of a co-extrusion head according to the invention.

In order to co-extrude a complex profiled element 20, the invention proposes a co-extrusion head 50. As illustrated in FIG. 3, the head 50 is intended to be mounted on a co-extrusion machine 52 with cylindrical roller 54. To this end, the head 50 includes a lower wall 56 of cylindrical profile extending radially lengthwise in a longitudinal direction DL1 about a central axis AC1 and extending rectilinearly widthwise in a transverse direction DT1 parallel to the central axis AC1 and perpendicular to the longitudinal direction DL1. This lower wall 56 is intended to be attached to the exterior wall 58 of the cylindrical roller 54 so that the complex profiled element 20 can be co-extruded. During operation of the co-extrusion machine, the cylindrical roller 54 is rotated R1 about the central axis AC1.

According to the invention, the head 50 includes, from upstream to downstream of this lower wall 56 of cylindrical profile, and in the longitudinal direction DL1:

a) a first extrusion unit B60 having a first extrusion duct 60 opening into the lower wall 56 of the co-extrusion head, this first extrusion duct 60 being divided into various sub-ducts 60-1, 60-2, 60-3, 60-4 in the transverse direction DT1, b) a first profiling blade 62 defining a first shaping profile P62 that is discontinuous in the transverse direction DT1 and situated radially beyond the lower wall 56 of the co-extrusion head intermittently in the transverse direction DT1, c) a second extrusion unit B64 having a second extrusion duct 64 opening into the lower wall 56 of the co-extrusion head, this second extrusion duct 64 being divided into various sub-ducts 64-1, 64-2, 64-3, 64-4 in the transverse direction DT1, d) a second profiling blade 66 defining a second shaping profile P66 situated radially beyond the lower wall 56 of the co-extrusion head, this second shaping profile P66 having no discontinuity in the transverse direction DT1 but the second profiling blade 66 having at least one tooth 67-1, 67-2, 67-3 extending radially inwards but not reaching the lower wall 56 of the co-extrusion head, each tooth 67-1, 67-2, 67-3 being situated in the continuation of the longitudinal direction DL1 of a divider 72-1, 72-2, 72-3 dividing the first extrusion duct 60 into sub-ducts 60-1, 60-2, 60-3, 60-4 in the transverse direction DT1, creating a discontinuity in the first shaping profile P62 of the first profiling blade 62 in the transverse direction DT1, and dividing the second extrusion duct 64 into sub-ducts 64-1, 64-2, 64-3, 64-4 in the transverse direction DT1, and this second profiling blade 66 incorporating at least one third extrusion duct 68-1, 68-2, 68-3 opening into the lower wall 56 of the co-extrusion head, and each outlet 70-1, 70-2, 70-3, 70-4 of a third extrusion duct closely adjoining a tooth 67-1, 67-2, 67-3 of the second profiling blade 66, and e) a third profiling blade 74 defining a final shaping profile P74 situated radially beyond the lower wall 56 of the co-extrusion head, this final shaping profile P74 having no discontinuity in the transverse direction DT1, the third profiling blade 74 having at least one tooth 74-1, 74-2, 74-3 extending radially inwards but not reaching the lower wall 56 of the co-extrusion head, each tooth 74-1, 74-2, 74-3 of this third profiling blade 74 being situated in front of a tooth 67-1, 67-2, 67-3 of the second profiling blade 66.

While the first extrusion duct 60 allows the first material of the sublayer 22 to be extruded, the sub-ducts 60-1, 60-2, 60-3, 60-4 allow this first material to be extruded discontinuously in the co-extrusion width L50 of the co-extrusion head 50. Thus, the sub-ducts 60-1, 60-2, 60-3, 60-4 make it possible to generate the discontinuities D20 in the sublayer 22 as soon as this first material is extruded.

Next, the discontinuous first profiling blade 62 includes projecting shapes 62-1, 62-2, 62-3 extending radially inwards as far as the lower wall 56 and allowing the first material of the sublayer 22 to be profiled while at the same time maintaining the discontinuities D20 created upstream in this sublayer by the sub-ducts 60-1, 60-2, 60-3, 60-4.

While the second extrusion duct 64 allows the second material of the tread 24 to be extruded, the sub-ducts 64-1, 64-2, 64-3, 64-4 allow this second material to be extruded discontinuously in the co-extrusion width L50 of the co-extrusion head 50. Thus, the sub-ducts 64-1, 64-2, 64-3, 64-4 make it possible to generate the discontinuities D20 in the tread 24 as soon as this second material is extruded.

The teeth 67-1, 67-2, 67-3 of the second profiling blade 66 then allow the first and second materials of the sublayer 22 and of the tread 24 to be profiled in the continuation of the discontinuities D20 created upstream in this sublayer 22 and in this tread 24 by the sub-ducts 60-1, 60-2, 60-3, 60-4 of the first duct 60 and by the sub-ducts 64-1, 64-2, 64-3, 64-4 of the second duct 64.

By being closely adjacent to a tooth 67-1, 67-2, 67-3 of the second profiling blade 66, the outlet 70-1, 70-2, 70-3 of each third extrusion duct 68-1, 68-2, 68-3 allows the third material to be extruded in the region of the sidewall 34 of a future groove 26 and thus allows the inserts 28 of this third material to be created in the profiled element 20.

The third profiling blade 74 completes the profiling of the three materials and gives the profiled element 20 the desired final exit profile. Each tooth 74-1, 74-2, 74-3 of this third blade 74 is situated in the continuation of a tooth 67-1, 67-2, 67-3 of the second profiling blade 66 and allows a groove 26 to be created in the complex profiled element 20 closely adjacent to one or two inserts 28 in the transverse direction DT1.

In the co-extrusion head 50 according to the invention, each projecting form 62-1, 62-2, 62-3 of the first profiling blade 62 respectively forms part of a divider 72-1, 72-2, 72-3.

When the co-extrusion head 50 is mounted on the co-extrusion machine 52, the ducts 60, 64 and the sub-ducts 60-1, 60-2, 60-3, 60-4, 64-1, 64-2, 64-3, 64-4 open into the lower wall 56 and the shaping profiles P62 and P66 of the first and second profiling blades are closed by the external wall 58 of the roller 54.

In order to create a band 37 of non-zero height and width from the first material of the sub-layer 22 under each insert 28, each divider 72-1, 72-2, 72-3 includes at least one longitudinal cut-out 94-1, 94-2, 94-3, 94-4 extending from the first extrusion unit B60 to the second extrusion unit B64 via the first profiling blade 62 and extending heightwise radially outwards from the lower wall 56 of the co-extrusion head.

Considered facing the first extrusion unit B60 and the first profiling blade 62 and the second extrusion unit B64, the longitudinal surface 96-1, 96-2, 96-3, 96-4 of each divider 72-1, 72-2, 72-3 starting from a longitudinal cut-out extends radially at various constant heights from the lower wall 56 of the co-extrusion head.

More specifically, and as illustrated in FIG. 7, with the longitudinal surface 96-1, 96-2, 96-3, 96-4 of a longitudinal cut-out extending at a first height H1 with respect to the lower wall 56 of the co-extrusion head when this longitudinal surface belongs to the first extrusion unit B60, and the longitudinal surface 96-1, 96-2, 96-3, 96-4 of a longitudinal cut-out extending at a second height H2 with respect to the lower wall 56 of the co-extrusion head when this longitudinal surface belongs to the first profiling blade 62 and to the second extrusion unit B64, the first height H1 of this longitudinal surface is greater than the second height H2 of this longitudinal surface. Thus, the height of first material present in the longitudinal cut-outs is progressively reduced in stages, making it possible to ensure the correct geometry of the band 38 of first material under an insert 28.

In order to extrude a band 37 of first material of non-zero height and width upstream of each third-material outlet section, each longitudinal cut-out 94-1, 94-2, 94-3, 94-4 opens upstream and facing an outlet 70-1, 70-2, 70-3, 70-4 of a third extrusion duct 68-1, 68-2, 68-3 of the second profiling blade 66.

Also, with the longitudinal surface 96-1, 96-2, 96-3, 96-4 of a longitudinal cut-out extending at a height H2 with respect to the lower wall 56 of the co-extrusion head when this longitudinal surface belongs to the first profiling blade 62 and to the second extrusion unit B64, and with the lower edge 71-1, 71-2, 71-3, 71-4 of each outlet 70-1, 70-2, 70-3, 70-4 of a third extrusion duct 68-1, 68-2, 68-3 facing which this longitudinal surface 96-1, 96-2, 96-3, 96-4 opens extending at a height H3 with respect to the lower wall 56 of the co-extrusion head, the height H3 of the lower edge 71-1, 71-2, 71-3, 71-4 of an outlet 70-1, 70-2, 70-3, 70-4 is less than the height H2 of the longitudinal surface 96-1, 96-2, 96-3, 96-4 belonging to the first profiling blade 62 and to the second extrusion unit B64.

In order to give the cross section of an insert 28 at least one triangular subsection in the transverse plane PT of the profiled element 20, the outlet cross section of each third duct 68-1, 68-2, 68-3 includes at least one triangular subsection in a transverse plane PT50 perpendicular to the longitudinal direction DL1. More specifically, one vertex of this triangular subsection extends radially outwards from the lower wall 56 of the co-extrusion head.

In order to create two triangular inserts 28 on either side of a groove 26 of the profiled element 20, a third extrusion duct 68-1 has two outlets 70-1, 70-2 closely adjacent to either side of a tooth 67-1 of the second profiling blade 66, each of these outlets 70-1, 70-2 having a triangular cross section.

Also, the divider 72-1 situated upstream of the tooth 67-1 flanked by the two outlets 70-1, 70-2 of a third extrusion duct 68-1 includes two lateral longitudinal cut-outs 94-1, 94-2, each of these lateral longitudinal cut-outs 94-1, 94-2 opening facing one of the two outlets 70-1, 70-2 of the third extrusion duct 68-1.

In order to extrude the band 38 of tread 24 that forms the bottom of a groove 26 surrounded by two inserts 28 of triangular cross section, each divider 72-1 in the continuation of which there is situated a tooth 67-1 closely adjacent to two outlets 70-1, 70-2 has an internal duct 76 connecting at least one sub-duct 64-1, 64-2, and preferably both sub-ducts 64-1, 64-2, of the second extrusion duct 64 to the lower wall 56 of the co-extrusion head, this internal duct 76 opening into this lower wall 56 upstream of the two outlets 70-1, 70-2 of the third duct 68-1 in the longitudinal direction DL 1 and between these two outlets 70-1, 70-2 in the transverse direction DT1.

Figure 4:
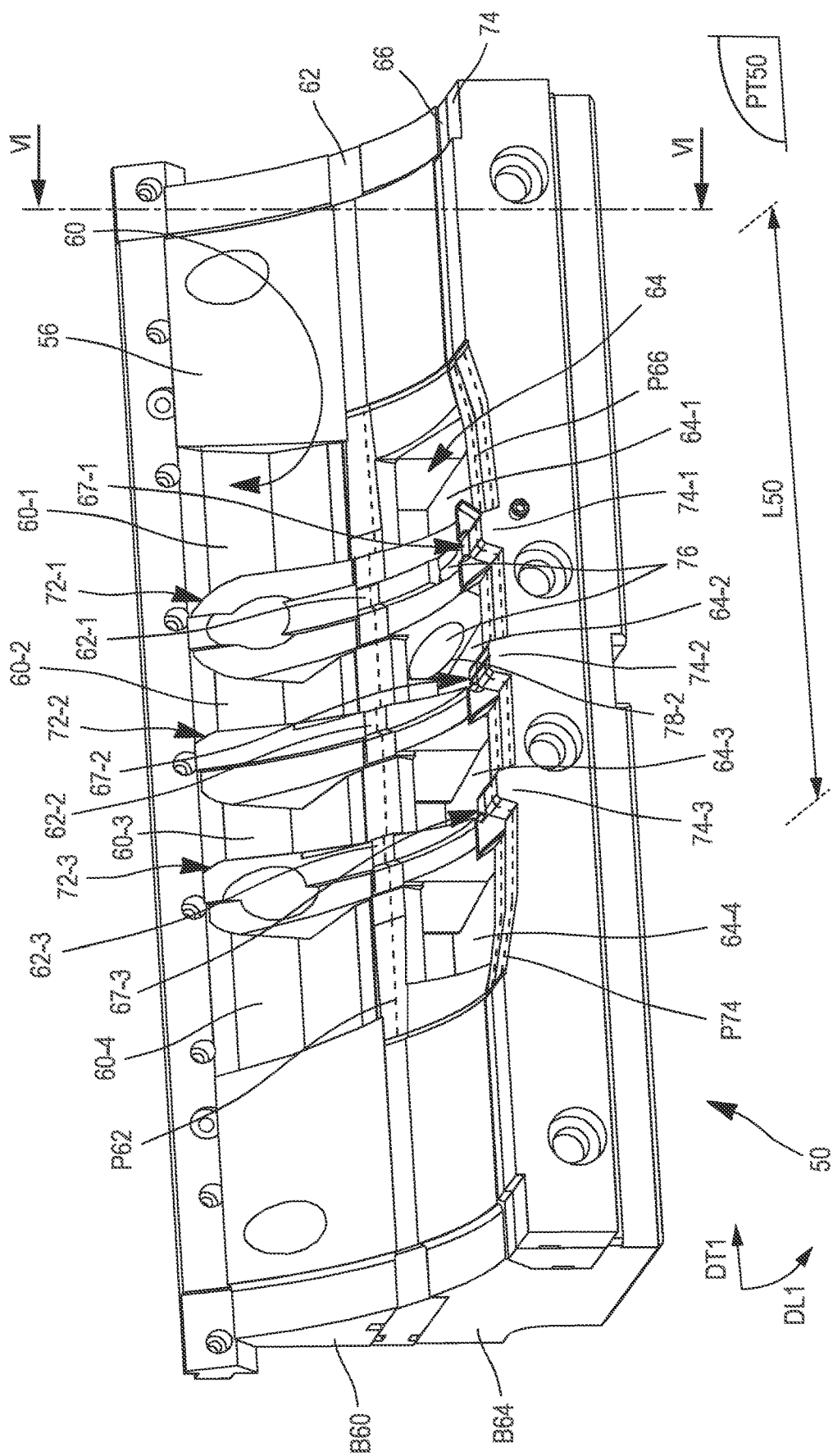
FIG. 4 is a perspective view of a co-extrusion head according to the invention.

As shown in FIG. 4, this internal duct 76 is produced through the divider 72-1 that divides the second extrusion duct 64 into two sub-ducts 64-1, 64-2 and in the continuation of which the two triangular outlets 70-1, 70-2 of the third duct 68-1 are situated, some distance apart. For preference, and in order to ensure that the internal duct 76 is supplied with the tread material 24, this internal duct 76 includes two inlets 78-1, 78-2 respectively connected to the two sub-ducts 64-1, 64-2.

In the example illustrated in the figures, the co-extrusion head 50 has three dividers 72-1, 72-2, 72-3, in the transverse direction DT1, these three dividers dividing the first extrusion duct 60 into four sub-ducts 60-1, 60-2, 60-3, 60-4, creating three discontinuities in the first shaping profile P62 of the first profiling blade 62 and dividing the second extrusion duct 64 into four sub-ducts 64-1, 64-2, 64-3, 64-4. The projecting shapes 62-1, 62-2, 62-3 of the first profiling blade 62 form an integral part of these dividers 72-1, 72-2, 72-3.

Still in the example illustrated in the figures, the co-extrusion head 50 has two consecutive dividers 72-3, 72-2 in the transverse direction DT1 each followed in the longitudinal direction DL1 by a single triangular outlet 70-4, 70-3, the first divider 72-1 being followed in the longitudinal direction DL1 by two triangular outlets 70-1, 70-2.

With a view to extruding the various materials of the tread 24, of the sublayer 22 and of the inserts 28, and as shown in FIGS. 3 and 6, the first duct 60 is connected to a first extruder E60, the second duct 64 is connected to a second extruder E64, and the third ducts 68-1, 68-2, 68-3 of the second profiling blade 66 are connected to a third extruder E68.

More specifically, the third ducts 68-1, 68-2, 68-3 of the second profiling blade 66 are connected to a third extruder E68 via conduits 84, 86 opening onto the upper face 88 of the co-extrusion head 50.

As shown in FIG. 7, the first extrusion duct 60 belongs to a first extrusion unit B60, and this first extrusion duct 60 opens onto the rear face 90 of the co-extrusion head 50 where it is connected to the first extruder E60. The second extrusion duct 64 belongs to a second extrusion unit B64, and this second extrusion duct 64 opens onto the rear face 90 of the co-extrusion head 50 where it is connected to the second extruder E64.

As shown in FIGS. 6 to 9, the third ducts 68-1, 68-2, 68-3 of the second profiling blade 66 are made in the body 92 of this second profiling blade 66, whereas the conduits 84, 86 connecting them to the third extruder E68 are made through the second extrusion unit B64.

Also, the co-extrusion had 50 is formed by the assembly of the first extrusion unit B60, of the first profiling blade 62, of the second extrusion unit B64, and of the second and third profiling blades 66 and 74.

More generally, the present invention also relates to a method of co-extruding a complex rubber profiled element 20 intended for the manufacture of a tyre, it being possible notably for this method to be implemented using the co-extrusion head 50 that has just been described.

According to the invention, the method incudes extruding and profiling the various rubbery materials of this profiled element 20 over a given co-extrusion width L50 and in a longitudinal direction DL1 of co-extrusion perpendicular to the transverse plane PT of the co-extruded profiled element, the method having the following succession of steps consisting in:

a) extruding the first material, this being performed discontinuously across the co-extrusion width L50, b) first profiling of this first material, performed discontinuously across the co-extrusion width L50, c) extruding the second material, this being performed discontinuously across the co-extrusion width L50 and performed in such a way as to superpose the second material on the first material, d) profiling the first and second materials according to a profile P66 exhibiting no discontinuity across the co-extrusion width L50 but creating at least one longitudinal groove 26 in the profiled element 20, this profiling being performed jointly with at least one extruding of the third material next to each longitudinal groove 26 created in the profiled element 20, e) final profiling of the first, second and third materials according to a final profile P74 exhibiting no discontinuity across the co-extrusion width L50 but allowing its final shape to be given to each longitudinal groove 26 created in the profiled element 20 in the preceding step d) and situated transversely next to each insert 28 originating from an extrusion of the third material according to the preceding step d).

Advantageously, by extruding the third material of the inserts 28 at the end of the co-extrusion method, the geometry of the extruded inserts 28 is preserved from the flows of the first and second materials extruded upstream.

More specifically, because the third material is extruded next to each longitudinal groove 26 according to an outlet cross section of determined shape, a band of non-zero height and width of the first material is extruded upstream of each third-material outlet section and underneath each third-material outlet section.

More specifically, and in order to ensure the correct geometry of the band 38 of the first material present under an insert 28, the height of first material extruded upstream of each third-material outlet section is progressively reduced.

More specifically still, the height of first material extruded upstream of each third-material outlet section is reduced in stages.

During step d), the third material is extruded according to an outlet cross section in a transverse plane PT50 containing at least one triangular subsection and in such a way that this triangular subsection constitutes one sidewall of a longitudinal groove 26 created in the profiled element 20.

In order to create two triangular inserts 28 on either side of a groove 26 of the profiled element 20, during step d), the third material is extruded according to an outlet cross section in a transverse plane PT50 containing two triangular subsections distant from one another in the transverse direction of extrusion DT1 and in such a way that the third material extruded by these triangular subsections constitutes the two sidewalls of a longitudinal groove 26 created in the profiled element 20.

In order to extrude the band 38 of tread 24 that forms the bottom of a groove 26 surrounded by two inserts 28 of triangular section at the same time as performing step c), part of the flow of the second material is diverted toward a discontinuity D20 created during steps a), b) and c) in the superposed first and second materials and in such a way that the diverted flow of second material arrives between the two triangular outlet subsections of the third material in the transverse direction of extrusion DT1.

In order to insert inserts 28 into the three longitudinal grooves 26 of a profiled element 20, during a steps a) to d), three discontinuities are created in the first and second materials in the transverse direction of extrusion DT1.

If the method is being implemented on the co-extrusion machine 52 with roller 54, the longitudinal direction of co-extrusion DL1 extends radially around the central axis AC1.

For preference, the extruding and profiling steps of the method are performed between a roller 54 and an extrusion head 50 having a lower wall 56 of cylindrical profile collaborating with the exterior wall 58 of the roller.

The present invention also covers a complex rubber profiled element obtained from the method that has just been described, and, for example, using the co-extrusion head that has just been described.

At the same time, the invention also covers a tyre manufactured from a complex rubber profiled element obtained from the method that has just been described.

The invention claimed is:

1. A head for co-extrusion of a rubber profiled element intended for the manufacture of a tire, the head being configured to be mounted on a cylindrical-roller co-extrusion machine and the head comprising a lower wall of cylindrical profile extending radially lengthwise in a longitudinal direction about a central axis and extending rectilinearly widthwise in a transverse direction parallel to the central axis and perpendicular to the longitudinal direction, and the head comprising, from upstream to downstream of the lower wall of cylindrical profile, and in the longitudinal direction:

(a) a first extrusion unit comprising a first extrusion duct opening into the lower wall of the head, the first extrusion duct being divided into sub-ducts in the transverse direction;

(b) a first profiling blade defining a first shaping profile that is discontinuous in the transverse direction and situated radially beyond the lower wall of the head intermittently in the transverse direction;

(c) a second extrusion unit comprising a second extrusion duct opening into the lower wall of the head, the second extrusion duct being divided into sub-ducts in the transverse direction;

(d) a second profiling blade defining a second shaping profile situated radially beyond the lower wall of the head, the second shaping profile having no discontinuity in the transverse direction, the second profiling blade comprising at least one tooth extending radially inward but not reaching the lower wall of the head, each tooth being situated in a continuation of the longitudinal direction of a divider dividing the first extrusion duct into the sub-ducts in the transverse direction, creating a discontinuity in the first shaping profile of the first profiling blade in the transverse direction, and dividing the second extrusion duct into sub-ducts in the transverse direction, the second profiling blade incorporating at least one third extrusion duct opening into the lower wall of the head, and each outlet of the at least one third extrusion duct adjoining a tooth of the second profiling blade; and (e) a third profiling blade defining a final shaping profile situated radially beyond the lower wall of the head, the final shaping profile having no discontinuity in the transverse direction, the third profiling blade comprising at least one tooth extending radially inward but not reaching the lower wall of the head, and each tooth of the third profiling blade being situated in front of a tooth of the second profiling blade.

2. The head according to claim 1, wherein each divider comprises at least one longitudinal cut-out extending from the first extrusion unit to the second extrusion unit via the first profiling blade and extending heightwise radially outward from the lower wall of the head.

3. The head according to claim 2, wherein a longitudinal surface of each divider, starting from a longitudinal cut-out, extends radially at various constant heights from the lower wall of the head, the longitudinal surface defined as facing the first extrusion unit and the first profiling blade and the second extrusion unit.

4. The head according to claim 3, wherein, with the longitudinal surface of a longitudinal cut-out extending at a first height with respect to the lower wall of the head when the longitudinal surface belongs to the first extrusion unit, and with the longitudinal surface of a longitudinal cut-out extending at a second height with respect to the lower wall of the head when the longitudinal surface belongs to the first profiling blade and to the second extrusion unit, the first height is greater than the second height.

5. The head according to claim 2, wherein each longitudinal cut-out opens upstream of and faces an outlet of a third extrusion duct of the second profiling blade.

6. The head according to claim 5, wherein, with a longitudinal surface of a longitudinal cut-out extending at a height with respect to the lower wall of the head when the longitudinal surface belongs to the first profiling blade and to the second extrusion unit, and with a lower edge of each outlet of a third extrusion duct facing the longitudinal surface opens extending at a height with respect to the lower wall of the head, the height of the lower edge of each outlet is less than the height of the longitudinal surface belonging to the first profiling blade and to the second extrusion unit.

7. The head according to claim 1, wherein the outlet cross-section of each third duct comprises at least one triangular subsection in a transverse plane perpendicular to the longitudinal direction.

8. The head according to claim 7, wherein, with a third extrusion duct comprising two outlets adjacent to either side of a tooth of the second profiling blade, each of the two outlets has a triangular cross-section.

9. The head according to claim 8, wherein each divider, in the continuation of which there is situated a tooth adjacent to two outlets, comprises an internal duct connecting at least one sub-duct of the second extrusion duct to the lower wall of the head, the internal duct opening into the lower wall upstream of the two outlets of the third duct in the longitudinal direction and between the two outlets in the transverse direction.

10. The head according to claim 1 comprising three dividers in the transverse direction, the three dividers dividing the first extrusion duct into four sub-ducts, creating three discontinuities in the first shaping profile of the first profiling blade and dividing the second extrusion duct into four sub-ducts.

11. A machine for co-extrusion of a rubber profiled element intended for the manufacture of a tire, the machine comprising a cylindrical roller and a head according to claim 1 mounted on the cylindrical roller.

* * * * *